US010632566B2

(12) United States Patent
Sparks

(10) Patent No.: US 10,632,566 B2
(45) Date of Patent: Apr. 28, 2020

(54) SYSTEM AND METHOD FOR CONTROLLING THE INPUT ENERGY FROM AN ENERGY POINT SOURCE DURING METAL PROCESSING

(71) Applicant: Product Innovation and Engineering L.L.C., Saint James, MO (US)

(72) Inventor: Todd Eugene Sparks, Rolla, MO (US)

(73) Assignee: Product Innovation and Engineering L.L.C., Rolla, MO (US)

( * ) Notice: Subject to any disclaimer, the term of this patent is extended or adjusted under 35 U.S.C. 154(b) by 131 days.

(21) Appl. No.: 14/558,306

(22) Filed: Dec. 2, 2014

(65) Prior Publication Data

US 2016/0151859 A1 Jun. 2, 2016

(51) Int. Cl.
*B23K 26/34* (2014.01)
*B23K 26/03* (2006.01)
(Continued)

(52) U.S. Cl.
CPC ............ *B23K 26/34* (2013.01); *B22F 3/1055* (2013.01); *B23K 26/034* (2013.01);
(Continued)

(58) Field of Classification Search
CPC ........ B23K 26/00; B23K 26/02; B23K 26/03; B23K 26/34; B23K 26/32; B23K 26/032;
(Continued)

(56) References Cited

U.S. PATENT DOCUMENTS 4,663,513 A * 5/1987 Webber ................ B23K 26/034
219/121.6
4,817,020 A 3/1989 Chande
(Continued)

FOREIGN PATENT DOCUMENTS

DE 4234339 6/2002
DE 102010015023 10/2011
(Continued)

OTHER PUBLICATIONS

B. Dutta, Rapid manufacturing and remanufacturing of DoD components using direct metal deposition, Published in: The AMMTIAC Quarterly, vol. 6, No. 2, p. 5.
(Continued)

*Primary Examiner* — Tu B Hoang
*Assistant Examiner* — Vy T Nguyen
(74) *Attorney, Agent, or Firm* — Don V. Kelly; Evans & Dixon, L.L.C.

(57) ABSTRACT

A method for controlling, during metal processing, the input energy from an energy point source that directs focused emitted energy onto a metal workpiece having a geometry, wherein the directed focused emitted energy creates a melt pool and hot zone on the workpiece that emit radiation during the process. The method comprises determining a wavelength range for the emitted radiation that is within a spectral range of radiation emitted by the hot zone during processing that is comparatively high in amount in relation to the amount of radiation emitted by the melt pool in that spectral range during processing; directing the beam onto the workpiece to generate a melt pool and hot zone on the structure; measuring the intensity of radiation within the determined wavelength range; and adjusting the input energy from the energy point source based upon the measured intensity of radiation within the determined wavelength range.

14 Claims, 8 Drawing Sheets

(3 of 8 Drawing Sheet(s) Filed in Color)

(51) Int. Cl.
*B22F 3/105* (2006.01)
*B33Y 10/00* (2015.01)

(52) U.S. Cl.
CPC ............... *B22F 2003/1056* (2013.01); *B22F 2003/1057* (2013.01); *B22F 2203/03* (2013.01); *B22F 2203/11* (2013.01); *B22F 2999/00* (2013.01); *B33Y 10/00* (2014.12); *Y02P 10/295* (2015.11)

(58) Field of Classification Search
CPC .............. B23K 26/034; B23K 2203/50; B23K 31/125; B23K 2201/001; B23K 35/0244; B23K 2203/08; B23K 2203/26; B23K 26/04; B23K 26/123; B23K 26/20; B23K 26/342; G01J 5/08; G01J 5/602; A61B 18/22; A61B 17/00
USPC ...... 219/121.66, 121.65, 121.83; 374/5, 121, 374/137, 141, 29, 44
See application file for complete search history.

(56) References Cited

U.S. PATENT DOCUMENTS

| | | | |
|---|---|---|---|
| 4,959,244 A | 9/1990 | Penney | |
| 5,155,329 A | 10/1992 | Terada | |
| 5,247,155 A | 9/1993 | Steen | |
| 5,283,416 A | 2/1994 | Shirk | |
| 5,334,191 A | 8/1994 | Poppa | |
| 5,449,882 A | 9/1995 | Black | |
| 5,517,420 A | 5/1996 | Kinsman | |
| 5,651,903 A | 7/1997 | Shirk | |
| 5,674,415 A | 10/1997 | Leong | |
| 5,854,751 A | 12/1998 | DiPietro | |
| 6,122,564 A * | 9/2000 | Koch | B22F 3/1055 700/123 |
| 6,188,041 B1 | 2/2001 | Kim | |
| 6,311,099 B1 | 10/2001 | Jasper | |
| 6,780,657 B2 | 8/2004 | Ino | |
| 6,809,820 B2 | 10/2004 | Snelling | |
| 6,813,533 B1 | 11/2004 | Semak | |
| 6,995,334 B1 | 2/2006 | Kovacevic | |
| 7,186,947 B2 | 3/2007 | Connally | |
| 8,426,770 B2 | 4/2013 | Pinon | |
| 8,777,482 B2 | 7/2014 | Pfitzner | |
| 2006/0032840 A1 | 2/2006 | Bagavath-Singh | |
| 2006/0249487 A1 | 11/2006 | Dunias | |
| 2007/0179484 A1 | 8/2007 | Sade | |
| 2008/0029495 A1 | 2/2008 | Emiljanow | |
| 2008/0296270 A1 | 12/2008 | Song | |
| 2009/0206065 A1 | 8/2009 | Kruth | |
| 2009/0255980 A1 | 10/2009 | Li | |
| 2009/0283501 A1 | 11/2009 | Erikson | |
| 2010/0134628 A1 | 6/2010 | Pfitzner | |
| 2011/0100964 A1 | 5/2011 | Burbaum | |
| 2012/0188365 A1* | 7/2012 | Stork | B23K 26/046 348/90 |
| 2013/0062324 A1* | 3/2013 | Dorsch | B23K 26/032 219/121.63 |
| 2013/0066403 A1 | 3/2013 | Giraud | |
| 2013/0168902 A1 | 7/2013 | Herzog | |
| 2013/0319580 A1 | 12/2013 | Ozbaysal | |
| 2013/0342678 A1* | 12/2013 | McAninch | B23K 31/125 348/90 |
| 2014/0175071 A1* | 6/2014 | Pfitzner | B23K 26/032 219/121.81 |
| 2014/0183582 A1* | 7/2014 | Lee | H01L 33/50 257/98 |
| 2015/0268099 A1* | 9/2015 | Craig | G01J 5/0003 374/130 |
| 2016/0185048 A1* | 6/2016 | Dave | B33Y 50/02 700/119 |

FOREIGN PATENT DOCUMENTS

| | | |
|---|---|---|
| DE | 102010039442 | 2/2012 |
| EP | 1340583 | 3/2003 |
| EP | 1958584 | 8/2008 |
| EP | 1099184 | 1/2014 |
| EP | 1693141 | 2/2014 |
| WO | WO 00/76715 | 12/2000 |

OTHER PUBLICATIONS

S. Cohen, A model for the reflectivity in laser-substrate interactions, Source: Journal of Applied Physics, v 64, n 10, pt.1, 5102-5, Nov. 15, 1988; Country of publication: USA.

Z. Ye, Real-time measure system of molten pool temperature field in laser remanufacturing, Published in: Lasers & Electro Optics & The Pacific Rim Conference on Lasers and Electro-Optics, 2009. CLEO/PACIFIC RIM '09.Conference on Date of Conference: 30—Aug. 3, 2009pp. 1-2E.

R. Fabbro, Study of keyhole geometry for full penetration Nd-Yag CW laser welding, Published in: Lasers and Electro-Optics Europe, 2005. CLEO/Europe. 2005 Conference on Date of Conference: Jun. 17-17, 2005 p. 659.

Govardhan, S.M, Real-time welding process control using infrared sensing, Thermal, Mechanical and Multi-Physics Simulation and Experiments in Microelectronics and Microsystems (EuroSimE), 2013 14th International Conference on Apr. 14-17, 2013 pp. 1-5.

Toshinari, O., Measurement of TIG weld pool surface temperature distribution by UV radiation thermometry, Published in: SICE 2002. Proceedings of the 41st SICE Annual Conference (vol. 1 )Date of Conference: Aug. 5-7, 2002 pp. 39-41 vol. 1.

Dutta, B., Additive manufacturing by direct metal deposition, Published in: Advanced Materials & Processes, Date: May 2011.

Heralic, Monitoring and Control of Robotized Laser Metal-Wire Deposition, Department of Engineering Science University West, Trollhattan, Sweden 2012.

Craeghs, Online Quality Control of Selective Laser Melting, Katholieke Universiteit Leuven, Departement of Mechanical Enginneering, Celestijnenlaan 300B, 3001 Haverlee (Belgium) 2011.

Barua, Development of a Low Cost Imaging System for a Laser Metal Deposition Process, Department of Manufacturing Engineering, Missouri University of Science and Technology.

Office Action dated Oct. 7, 2016 issued in co-pending U.S. Appl. No. 14/550,330.

* cited by examiner

SYSTEM AND METHOD FOR CONTROLLING THE INPUT ENERGY FROM AN ENERGY POINT SOURCE DURING METAL PROCESSING

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates to metal processing techniques, such as welding and additive metal layering that use an energy (heat) point source, such as a laser, electron beam emitter or plasma torch to emit focused heat energy to a workpiece.

BACKGROUND OF THE INVENTION

Current metal processing methods use energy point sources to fabricate and repair metal parts. Such metal processing techniques include welding and additive metal layering. These processes use an energy point source such as a laser, electron beam emitter or plasma torch, to focus emitted heat energy to a workpiece. In all of these techniques an energy point source directs energy upon a workpiece and creates a melt pool where the focused energy is incident upon the workpiece. In the case of welding, the melt pool is often referred to as a "weld pool." Additive metal deposition is one industrial process that uses focused emitted energy to build fully-dense structures by melting powdered or wire metal, via a laser or other energy source, into solidifying beads. The beads are deposited side by side and layer upon layer upon a workpiece substrate. It is known to utilize the process to repair and rebuild a worn or damaged component using a laser to build up structure on the component. The process is particularly useful to add features such as bosses or flanges on subcomponents of fabricated structures. The basic process involves adding layers to the component to create a surface feature on the component via the introduction of depositing material (delivered in the form of injected powder or a wire) into a laser beam. The additive process is known by several names including "laser cladding," "laser metal deposition," "direct metal deposition" or "additive metal layering."

Additive metal layering is typically performed by using a computer aided design ("CAD") to map the geometry of a part and then depositing metal on the part. The CAD mapped geometry is input into a computer-controlled (robotic) part handler that can manipulate the part in multiple axes of movement during the deposition process. In practice, the energy point source is under computer numerical control and emits focused energy onto a workpiece, producing the melt pool. A small amount of powder or wire metal is introduced into the melt pool, building up the part in a thin layer. The beam follows a previously determined toolpath. The toolpath is generated based on the CAD data that computes the needed part layer by layer. The beads are created by means of relative motion of the melt pool and the substrate, e.g. using an industrial robot arm or an XY-table, vis-à-vis the energy point source (beam source). (As used herein the action of moving the energy point source relative to the substrate means that either or both of the substrate or energy point source are moved to achieve relative movement.) The most popular approach combines a high power laser heat source with metal powder as the additive material.

The laser energy directed at the substrate (input energy) is absorbed by the substrate and causes local heat. The quality of the build is highly dependent on defining and maintaining the optimal conditions of the beam emitted by the energy point source. The objective is to accurately heat a desired volume of mass to achieve proper deposition of material. Temperature control is essential to achieve a successful build. Careful tuning of the deposition tool and parameters, such as the powder or wire feed rate, the energy input, and the traverse speed are therefore important in order to obtain layers that are free from defects such as shape irregularities, lack-of-fusion or cracks. Input energy may be modulated by changing the power level or duty cycle of the source. Droplet forming, i.e. globular transfer of the molten metal, is also a common disturbance that affects the geometrical profile of the deposited beads and stability of the additive layers.

Regulating the necessary needed input energy is critical to system operation and achieving a high-quality layered end product. The currently known laser additive processes attempt to address deposition quality issues in either of two ways. In this respect, the prior laser additive processes use a constant laser power or one regulated by a feedback (a/k/a "closed-loop") sensor. The issue with using a constant laser power is that the operator has to optimize the power level for a worst case scenario, typically, the start of the process. This results in variations in both geometry and material properties as the melt pool size and temperature gradients vary with the local energy balance conditions around the melt pool. Using a constant energy throughout in an additive deposition process is problematic because the additive process changes the geometry of the built structure during the process. Hence, the chosen constant power level represents a compromise selection. For example and as shown in FIG. 1A, at the start of the deposition process, the structure is positioned further from the laser source and too little energy is input into the deposition. At the mid-process point, shown in FIG. 1B, the target structure is closer to the energy point source and the appropriate energy is present in the workpiece. However, by the end of the process, as shown, in FIG. 1C, the workpiece is closer to the energy point source and too much energy is present in the work site.

Feedback systems represent an attempt to address the deficits of the constant power system. In an attempt to improve welding and deposition processes, the prior art feedback systems concentrate their efforts on monitoring the intra-process dimensions or thermal characteristics of the melt pool to determine its area. Such systems use a camera or sensor to obtain an image of the melt pool region and then process the image to determine the size or shape of the melt pool. The shape of the melt pool is then used as an input to determine needed system action, e.g., increase or decrease laser power, increase or decrease beam dwell time, etc.

The prior art systems focusing on the melt pool area do not accurately account for the full, three-dimensional nature of the process (melt pool depth is not considered). Without considering depth, it is not possible to make an accurate estimate of the energy balance at the melt pool without making some assumptions. This is because material properties of metals processed via point heat source methods are highly correlated to the temperature gradients around the solidification front. There are other deficits of the prior art system that relies upon melt pool characteristics for feedback purposes. In this respect, the image processing required to find and measure the melt pool area greatly reduces the rate at which these measurements can be taken. The longer the measurement takes, the less useful it is for system control. Moreover, when imparting point source heat energy near an edge or corner, the shape of the melt pool will change its shape from that of a more interior location. Hence, feedback systems and methods that rely upon melt pool shape and emissions can give an incomplete and inaccurate assessment of the energy in the work environment. There is thus a need in the art for an improved method of regulating energy from an energy point source during metal processing techniques.

SUMMARY OF THE INVENTION

The invention provides a method of regulating the input energy to address the energy balance at and around the melt pool during processes that use focused emitted energy from a controllable energy point source such as in laser deposition, tungsten inert gas ("TIG") welding, gas metal arc welding ("GMAW"), plasma transferred arc ("PTA") welding or electron beam ("EB") welding. An object of the invention, for example in the case of laser deposition, is a process whereby the operation is monitored in such a way that the quality of the build is detected more rapidly during the deposition process. To accomplish that objective, the surface temperature of a portion of the build is monitored during the laser deposition process. However, in contrast to prior art systems and methods, the present invention uses the state of the hot zone as a predictor of the overall state of the deposition environment. In more specific embodiments the invention is directed to a system and method that uses the state of the hot zone and not the state of the melt pool as an input to adjust process parameters, such as (but not limited to) laser power level or as in the case of a pulsed laser, duty cycle.

Significantly then, the present invention utilizes the emission of the hot zone as opposed to an odd assortment of melt pool characteristics as feedback input to control input energy. The invention involves detecting and measuring radiation within a selected wavelength range emitted by the system during processing. The amount of radiation within that wavelength range is used as an indicator of the amount of heat in the system during processing. Though the selected wavelength range is chosen because it provides an indicator of overall heat in the system, it more specifically represents an amount of heat in the hot zone of the material during processing. The selected wavelength range is chosen based upon the temperatures expected to be attained by the hot zone during processing, which temperatures are related to the solidus of the material Thus, part of the process is determining a "nominal magnitude" of radiation within the selected wavelength range for the feedback system to compare measurements against. The expected magnitude of the radiation within a selected wavelength range is system specific. In most situations, the radiation to be measured is visible radiation within a certain wavelength range. Aluminum is one notable exception because it does not emit enough visible light when processed. Generally speaking, the present invention includes a method and system for regulating the temperature gradient in a material (e.g. metal workpiece) by adjusting energy input from a point source (e.g. laser, electron beam) based upon a measurement of incandescence in a specific wavelength band that is correlated to the hot zone of the work environment. To measure the surface temperature of the hot zone, a certain range of emission (known to represent the integrity of the hot zone's state) can be measured using a sensor, including but not limited to a photo diode.

Thus, in a first preferred embodiment, the invention is directed to a method for controlling, during metal processing, the input energy from an energy point source that directs focused emitted energy on to a metal workpiece. The method comprises determining one or more wavelengths of radiation that will be emitted by the hot zone during processing in an amount that will be comparatively higher than the amount of radiation in those same one or more wavelengths emitted by either the melt pool or bulk structure during processing. The method further includes selecting a wavelength range of radiation for detection and measurement. The selected wavelength range includes the one or more wavelengths of radiation determined to be emitted by the hot zone during processing in an amount comparatively higher than that emitted by the melt pool or bulk structure. Focused emitted energy is directed from the energy point source onto the workpiece to generate a melt pool and hot zone on the workpiece. The intensity of radiation within the selected range of radiation is measured and the input energy from the energy point source is adjusted based upon the measured intensity of radiation within the selected wavelength range.

In another embodiment, the invention is directed to a method for controlling, during metal processing, the input energy from an energy point source that directs focused emitted energy onto a metal workpiece having a geometry. The directed energy creates a melt pool and hot zone on the workpiece that emit radiation during the process. The method includes determining a wavelength range for the emitted radiation that corresponds to a selected state of the hot zone during the process; directing the beam onto the workpiece to generate a melt pool and hot zone on the structure; measuring the intensity of radiation within the determined wavelength range; and adjusting the input energy from the energy point source based upon the measured intensity of radiation within the determined wavelength range.

In a more specific preferred embodiment, the invention is a method of forming a build having a geometry. The build is formed on a substrate by an additive layering process that involves: introducing stock material into a beam, the beam being produced by an energy point source and having a power level; and moving the energy point source relative to the substrate. The embodiment method comprises generating a melt pool and hot zone on the substrate by directing the beam onto the substrate and feeding the stock material into the melt pool. The intensity of radiation emitted by the hot zone within a specific wavelength range is measured. In response to the measured intensity of the radiation, the power level of the beam, duty cycle of the laser or other process parameter regulating input energy is adjusted.

The foregoing embodiment methods can be enhanced by including the following actions prior to generating the melt pool: a) creating a geometric description representing the geometry of the build during the additive layering; b) creating a path description that represents the path of the energy point source through space during the additive layering. The geometric description and path description are used during the additive layering process as inputs in conjunction with the measured intensity of the radiation to adjust the input energy from the energy point source.

In another embodiment, the invention is directed to a system for processing metal using an energy point source. The embodiment system comprises an energy point source configured to direct focused emitted energy upon the workpiece, the focused emitted energy when applied to the workpiece creates a melt pool and hot zone on the workpiece. The system includes one or more filters and one or more lenses that respectively filter and focus radiation upon a sensor. The lenses are configured to focus the received radiation from the hot zone onto the detector. The one or more filters filter out radiation outside the specific wavelength range. The sensor is adapted to receive and measure intensity of radiation within a specific wavelength range that corresponds to a determined condition of the hot zone. Further, the sensor is configured to output an electric signal based upon the intensity of that radiation. The system also includes a controller configured to receive the electric signal output by the sensor (which action for purposes of this application includes receiving a signal derived from the signal output of the sensor to account for actions such as signal amplification and modulation) and adjust input energy based upon the electric signal received from the sensor.

The embodiment systems discussed herein can include a support to hold the substrate and move the substrate relative to the energy point source. Further, the one or more lenses, one or more filters and sensor of the embodiment systems can be unitarily housed in a sensor-optics unit.

In another embodiment, the invention is directed to an additive layering system for forming a build having a geometry on a substrate. As explained below, the system comprises three main parts: optics to filter and collect the radiation and to focus it on a detector; a radiation detector to convert the radiation to an electric signal; and an electronic signal for processing the signal. A preferred embodiment system comprises a substrate support that moves the substrate relative to the energy point source. The energy point source is configured to generate a beam. The beam when applied to the substrate creates a melt pool and hot zone on the substrate. The energy point source is further configured to heat a stock material fed into the melt pool such that the stock material is deposited upon the substrate and forms the build. The system includes a sensor adapted to measure the intensity of radiation within a specific wavelength range emitted by the hot zone in an amount comparatively larger than that emitted by the melt pool or bulk structure and output an electric signal based upon the intensity of that radiation. A controller is configured to receive the electric signal output by the sensor and adjust input energy from the energy point source based upon the electric signal received from the sensor.

The present invention provides advantages over the prior art because it uses a simple, specific measurement (photon emission within a specific bandwidth range) of the hot zone as an estimator of the process state (i.e. the size of the zone visible to the sensor that is within a specified temperature band). Unlike the prior art methods that rely on melt pool characteristics, this measurement can be made robustly at very high rates and can be directly correlated to a required change in the current output power of the point heat source. Moreover, the present invention is relatively inexpensive and very fast. By measuring light intensity over a specific wavelength, one can estimate the size of a hot zone region at a specific temperature range. From this estimate, one can infer information about the energy balance at the melt pool very quickly

BRIEF DESCRIPTION OF THE DRAWINGS

The patent or application file contains at least one drawing executed in color. Copies of this patent or patent application publication with color drawings(s) will be provide by the Office upon request and payment of the necessary fee.

DETAILED DESCRIPTION

The inventive system and method described herein uses a simple, specific measurement (photon emission within a specific bandwidth range) as an estimator of the process state (i.e. the size of the hot zone visible to the sensor that is within a specified temperature band). This measurement can be made robustly at very high rates and can be directly correlated to a required change in the energy input from the point heat source.

Figure 4:
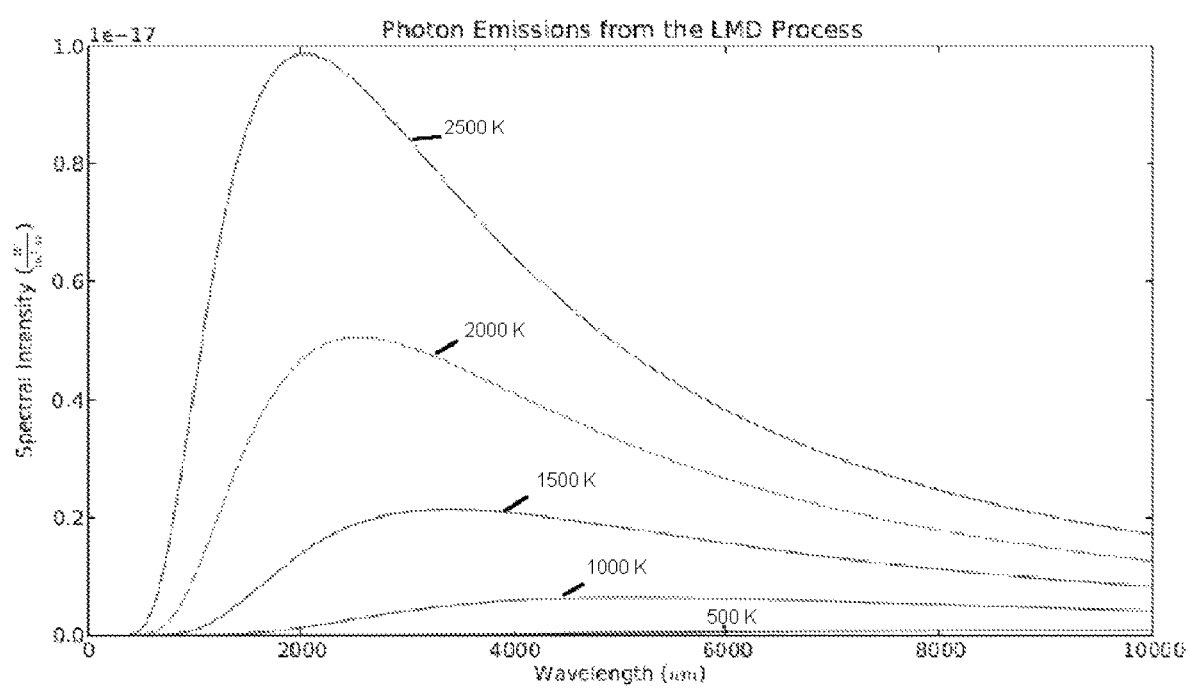
FIG. 4 is a graph depicting the relationship between spectral intensity and radiation wavelength emitted from the hot zone of the workpiece undergoing additive metal layering via laser deposition.

FIG. 4 depicts a graph demonstrating how emitted spectral intensity correlates to wavelength. This relationship can be described mathematically with Planck's equation:

$$I(\lambda,T)=(2hc^2/\lambda^5)(1/e^{-hc/\lambda kT}-1)$$

where:

I is the emitted energy per unit area per unit time per unit solid angle per unit wavelength;

$\lambda$ is wavelength;

k is Boltzmann's constant;

h is Planck's constant;

c is the speed of light; and

T is the absolute temperature of the black body (K).

Figure 1A:
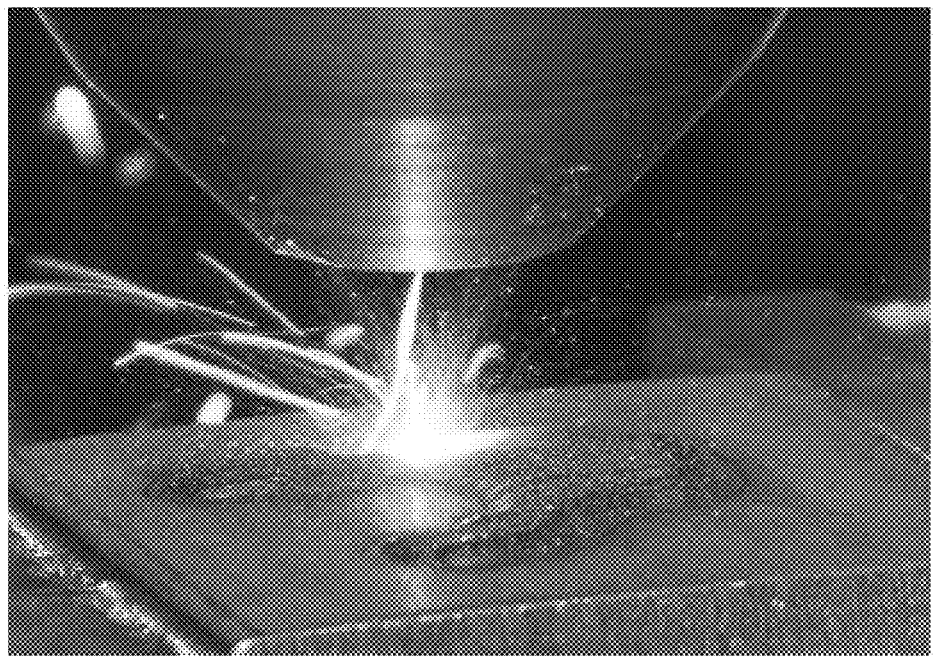
FIGS. 1A-1C are photographs showing the beginning, middle and end stages of an additive build process utilizing a constant power to form a build.
Figure 1B:
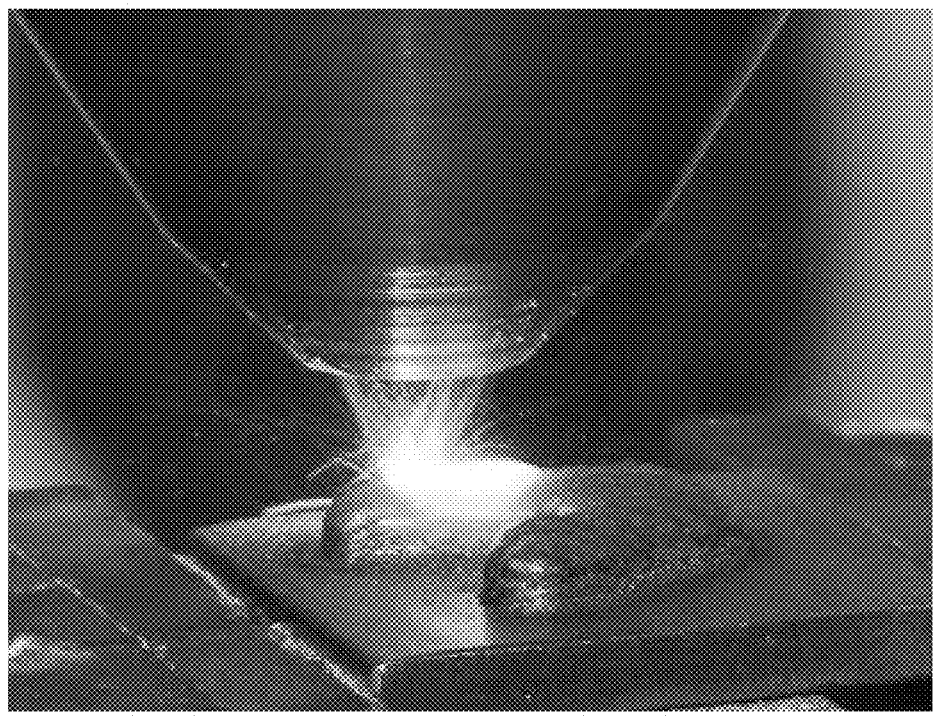
Figure 1C:
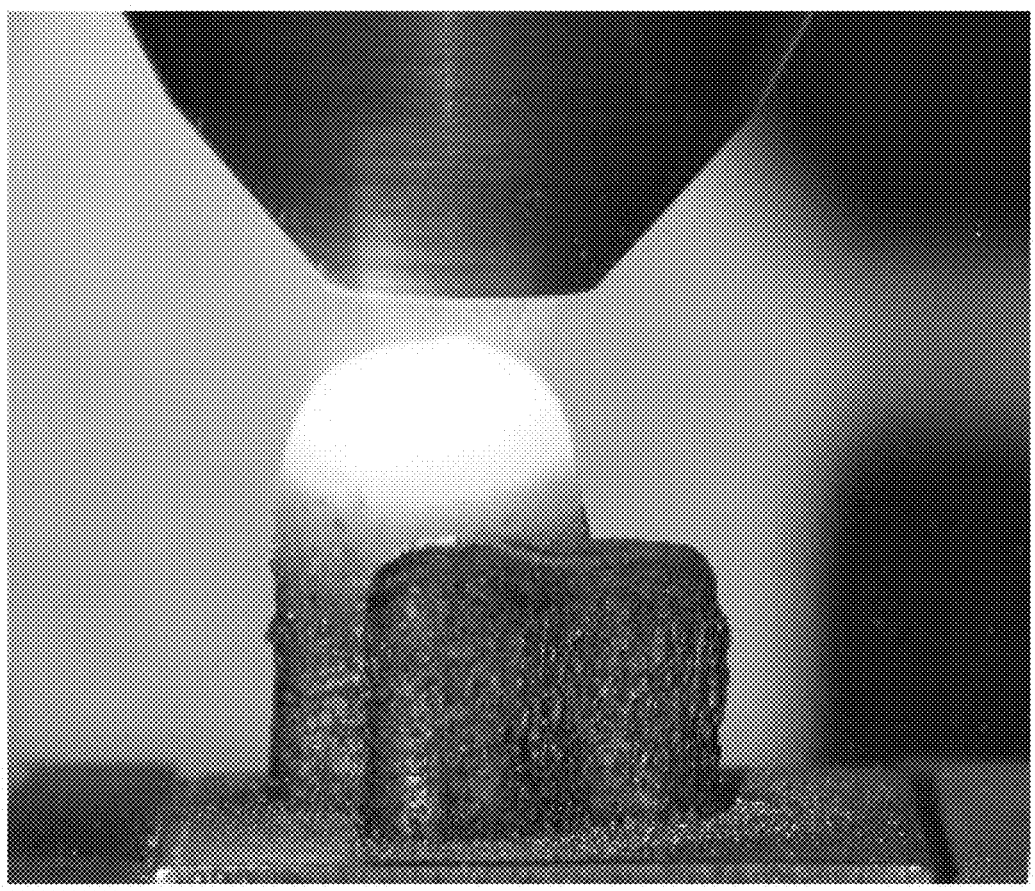
Figure 2:
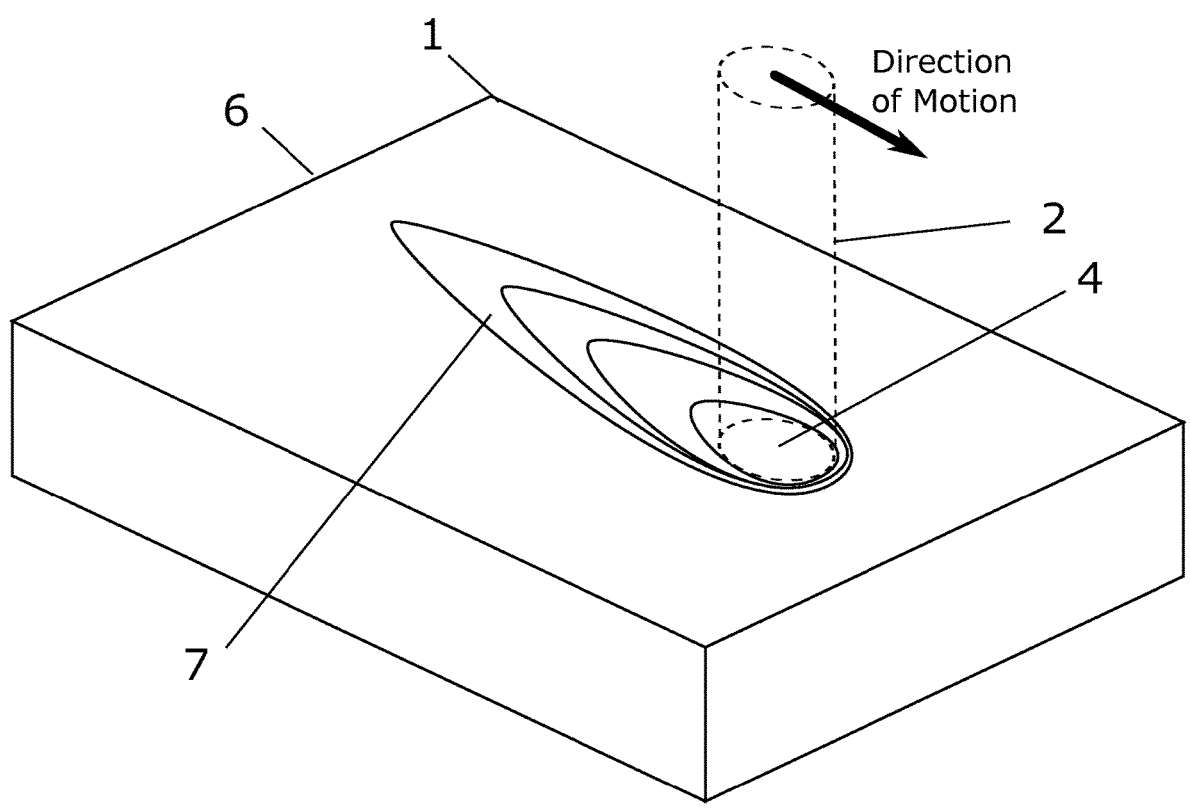
FIG. 2 is a depiction of the work environment of a metal substrate undergoing processing (additive metal layering) that uses an energy point source and that shows the thermodynamic constituents (melt pool, hot zone and bulk) of the workpiece.
Figure 7:
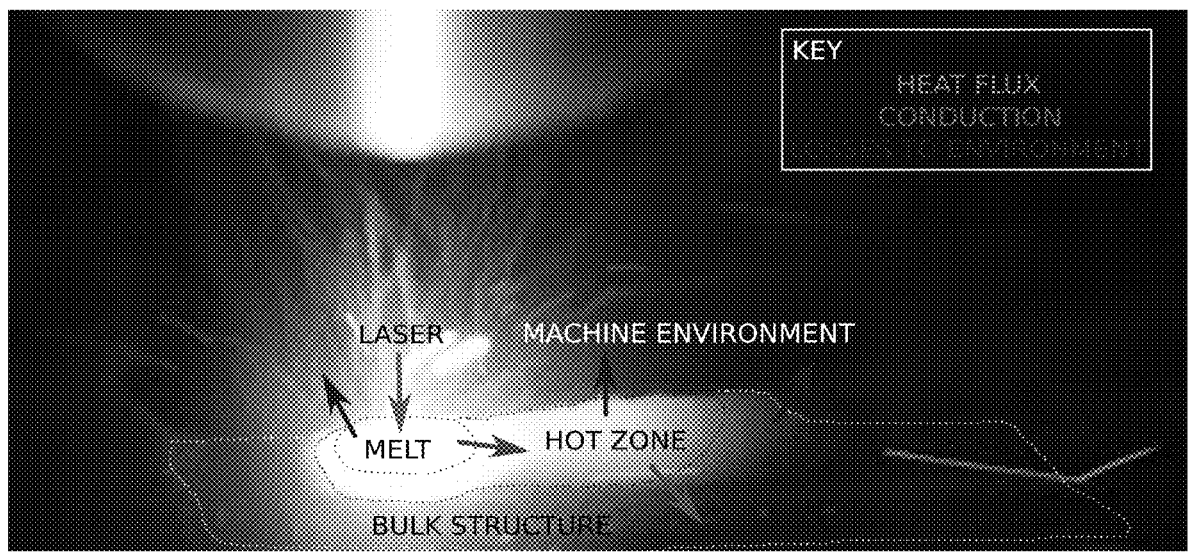
FIG. 7 is an image showing the outlines of a melt pool and hot zone of an actual work piece undergoing metal processing by an energy point source.

FIG. 2 schematically depicts the constituent areas of a substrate undergoing exemplary metal processing using an energy point source. FIG. 7 photographically depicts these constituent areas. The exemplary process is an additive process using an energy point source. As shown in FIGS. 2 and 7, a substrate 1 undergoing additive metal layering is impacted by beam 2 produced by energy point source (laser) 210. Upon beam 2 impacting substrate 1, a melt pool 4 is formed on substrate 1. The applied laser energy diffuses through the material of the build-substrate resulting in a certain temperature gradient profile in the material. This energy diffusion creates a region known as the hot zone (large teardrop shaped area) 7 in FIG. 2. As shown in FIG. 2, hot zone 7 typically comprises several subzones of varying temperature as indicated by the smaller teardrop shaped areas within the large teardrop shape. Bulk region 6 represents the remainder of substrate 1.

Figure 3:
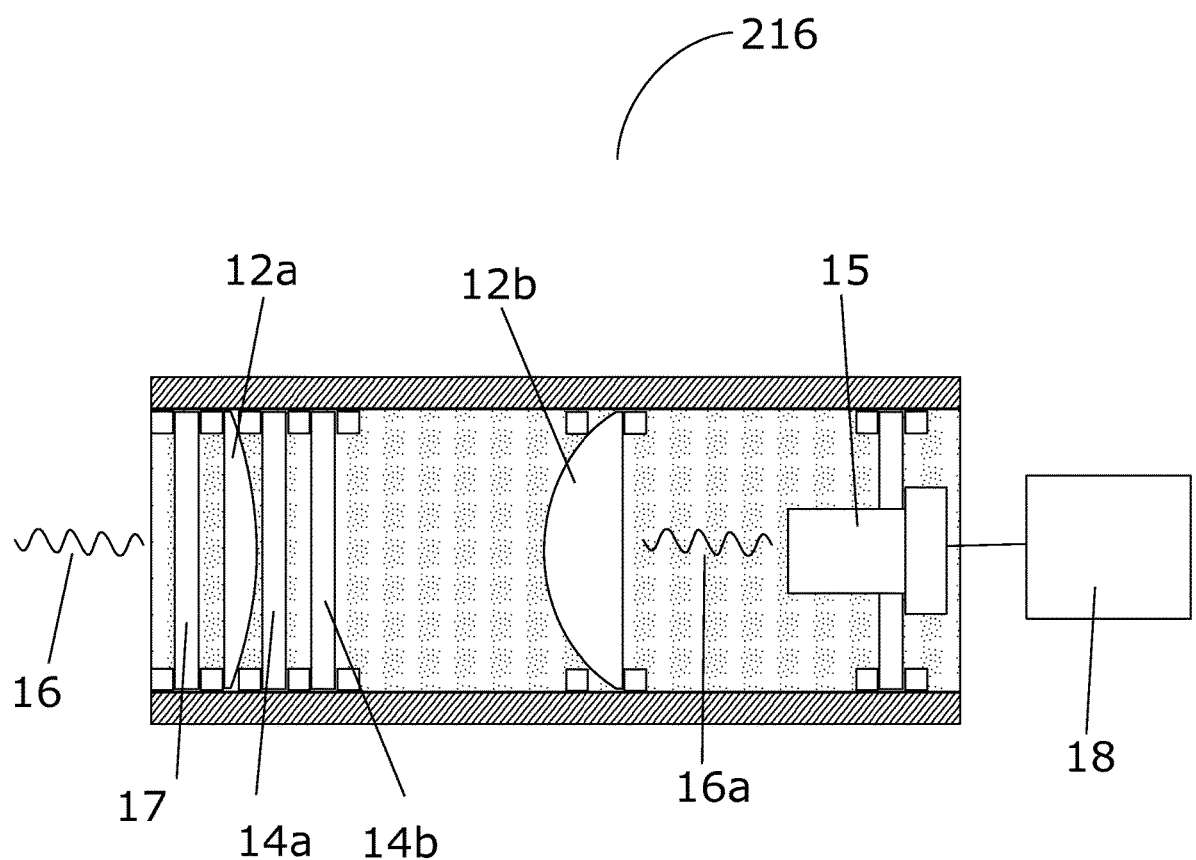
FIG. 3 is a sectional view of the components of the sensor-optics unit used to collect and detect the radiation from the hot zone.
Figure 5:
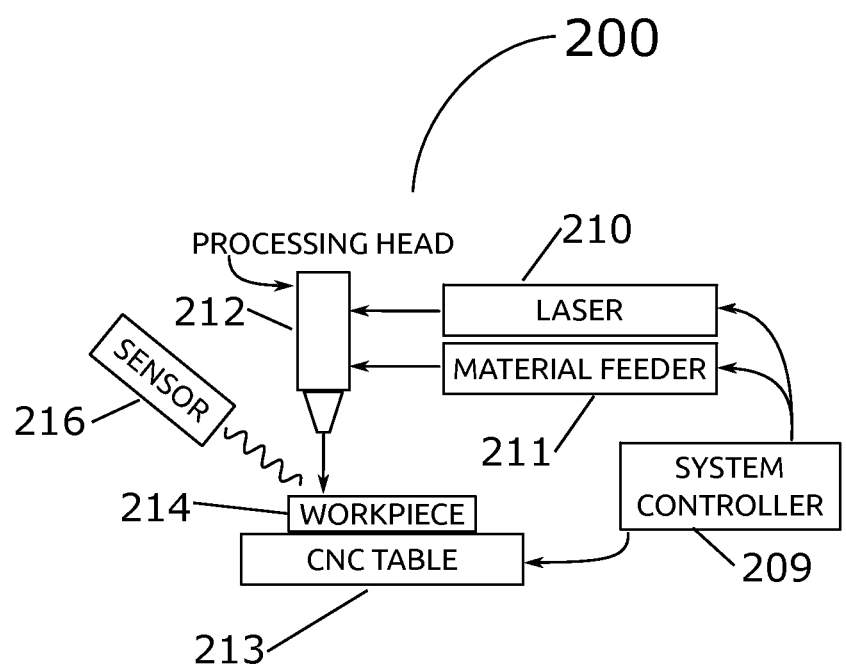
FIG. 5 depicts a preferred embodiment system for fabricating a part on a substrate using an energy point source (laser) that follows an additive path and that is controlled in accordance with the described laser power prediction method.

With this background a preferred embodiment system 200 can now be described. Such a system 200 is depicted in FIG. 5. System 200 includes standard processing components such as system controller 209, laser 210, material feeder 211, processing head 212, CNC table 213 and workpiece 214. System 200 also includes focusing, filtering and sensing elements, which in the preferred embodiment are unitarily contained in sensor-optics unit 216, a preferred embodiment of which is depicted in FIG. 3. As shown in FIG. 5, sensor-optics unit 16 is aimed at the workpiece of FIG. 2 with the melt pool in the center of the view area. Sensor-optics unit 216 preferably includes, but is not limited to, one or more focal lenses 12 (identified as 12a, 12b) and one or more filters 14. In the depicted embodiment, system 200 comprises a filter stack made up of filters 14a, 14b. Thus, FIG. 3 depicts preferred embodiment sensor-optics unit 216 as having a pair of focal lenses and two filters. This is merely suggested and exemplary. The number of lenses and filters can be varied depending upon the quality and characteristics of lenses and filters used. Lenses 12a, 12b focus workpiece thermal emission on to sensor 15. Filters 14a, 14b separate emitted radiation into the desired wavelength band for measuring. Preferably, one or more filters 14 block radiation outside of a determined wavelength spectrum as is more described below. The order in which the filters are placed in the sensor assembly is determined more by the spacing dictated by the focus optics, which are in turn dictated by the distance at which the sensor can be placed from the process.

Preferably, sensor-optics unit 216 also includes sensor 15, which is preferably a GaAsP photodiode. Sensor 15 acquires data on the incandescent photons in the wavelength range of interest. Hence, sensor 15 and one or more filters 14 are material specific and system specific. Another preferable sensor is an InGaAs photodiode. The distance of sensor-optics unit 216 from the workpiece and the diameter of the optics used to focus the light on photodiode 15 determines the solid angle of light sampled.

Upon beam 2 impacting substrate 1, melt pool 4 and hot zone 7 are formed on substrate 1. The work environment being processed incandesces and emits light 16. Incandescent light 16 enters sensor-optics unit 216. Light 16 that enters the sensor-optics unit 216 immediately encounters hot mirror 17 which reflects infrared radiation, which would also include any reflected light from the laser beam. Incoming light 16 then passes through lens 12a, filters 14a, 14b and lens 12b yielding filtered light 16a. Light 16a passed by the filters 14a, 14b and lenses 12a, 12b strikes photodiode 15. Filters 14a, 14b are intended to maximize the useful signal within the selected wavelength band received from the hot zone region. Notably, the filters do not eliminate any signal from the melt pool itself in that wavelength band. In this respect, the melt pool does contribute some radiation in this band, which is in essence a "noise" signal. The melt pool's signal in this band is relatively constant over a large regime of settings, which allows the signal to be treated as a base noise level. For example, in a prototype system, the subject signal is read by an 8 bit analog to digital converter (i.e. signal at the controller level is represented by a 0-255 integer value). Note that when the build is too cold, it is possible that there will be no actual signal from the hot zone. Thus, the signal to noise ratio is not constant across the entire possible regime. What is important is that the intensity of radiation within a selected wavelength range of radiation emitted by the hot zone during processing is comparatively higher in amount in relation to the amount of radiation emitted by the melt pool in that same spectral range during processing. Empirical testing indicates a signal of 120 is representative of a desired state of the hot zone during processing of certain materials. When the system starts up ("too cold" state), the signal will hover around 50. Critically, however, the signal (hot zone) to noise (melt pool) ratio when the system is at its desired state during processing is 1.4. Therefore, to be "comparatively higher" as that term is used herein, the intensity of radiation within the selected wavelength range emitted by the hot zone during processing should be at least twice as much as the radiation emitted by the melt pool in that same spectral range.

Photodiode 15 converts impinging light 16a into an electrical signal. The electrical signal is amplified and measured. The measured signal yields a measurement that is used to convert the signal to an integer value via an analog to digital converter 18. The determined integer value is compared to an empirically determined set point. The difference between the measured value and the set point is used to compute any necessary correction to the current laser power or process parameters. In this respect, a computer program or similar analyzing means uses the signal to determine the temperature of the hot zone and to control the laser source so that a desirable surface temperature and temperature depth profile are obtained based upon the radiation inputs. This is done using a proportionality constant for control that converts a measured voltage to a power adjustment. Predicted sensor output can be made mathematically by extension of the above mathematical equations as follows:

$$S(\lambda,T) = I(\lambda,T) a(T) \phi f(\lambda) r(\lambda)$$

where:

S is the current output by the sensor unit per unit wavelength in amps;

a(T) is the projected area of the object at temperature T;

φ is the solid angle viewable by the sensor unit in steradians;

f(λ) is the scaling factor from the filter stack in the sensor unit; and r(λ) is the detector sensitivity at a particular wavelength in amps/watts;

From the above one can construct an expression to predict the sensor output for a given scene in the deposition process as follows.

$$E(T_{low}, T_{high}, \lambda_{low}, \lambda_{high}) = \int_{T_{low}}^{T^{high}} \int_{\lambda_{low}}^{\lambda^{high}} S(\lambda,T) d\lambda dT$$

where:

E is the current ouptut by the sensor unit in amps;

$T_{low}$ is the projected area of the object at temperature T;

$T_{high}$ is the solid angle viewable by the sensor unit in steradians;

$\lambda_{low}$ is the scaling factor from the filter stack in the sensor unit; and $\lambda_{high}$ is the detector sensitivity at a particular wavelength in amps/watts.

Key to the present invention is that radiation from the hot zone as opposed to the melt pool is used as a feedback input. This is accomplished by measuring the intensity of radiation within a selected wavelength range within a spectral range of radiation emitted by the hot zone during processing that is comparatively higher in amount in relation to the amount of radiation emitted by the melt pool in that same spectral range during processing. To accurately represent the hot zone, the selected wavelength band corresponds to a temperature range below the solidus temperature for a given material. The invention was put into practice as a replacement for the watchful eye of an experienced laser deposition cell operator. As such, its operating range is focused on the visible spectrum. Sample wavelength ranges for some common materials are shown below in Table 1.

TABLE 1

Suitable Wavelength Ranges by Material

| Material | Solidus | Temperature Range | Color | Wavelength Range |
|---|---|---|---|---|
| Ti—6Al—4V | 1877 K | 1200 K-1400 K | Yellow | 550 nm-590 nm |
| SS316L | 1663 K | 1000 K-1200 K | Orange | 590 nm-620 nm |
| Inconel 625 | 1623 K | 900 K-1100 K | Red/Orange | 600 nm-700 nm |

In experiments with various metals, the above wavelength ranges in Table 1 were found to provide proper sensor input to allow for meaningful hot zone analysis and, in turn, energy source control. The equation above was used to verify that the sensor unit's detector size, sensitivity, and filter selection. The amount of radiation in the wavelength ranges listed in Table 1 that is emitted by the hot zone during processing is comparatively greater than that emitted by the melt pool or bulk structure. In fact, the amount of radiation in the indicated ranges that is emitted by the melt pool or bulk structure during processing is in the order of "noise" as compared to the amount emitted by the hot zone. As an enhancement of the invention, radiation emitted by the melt pool during processing that is comparatively high in relation to that emitted by the hot zone (i.e. infrared radiation) is filtered from reaching the sensor.

Using the inventive method and system the temperature of the build site can be determined by measuring the thermal radiation emitted from the hot zone and then used to control the heat of the build. The temperature is monitored in real time using hot zone emission to create inputs to control the laser in a way that is faster than methods and systems that rely upon area or thermal monitoring of the melt pool. The additive process is thus under a more efficient closed loop temperature control.

When beginning the deposition process the initial power output of the laser is usually set at 75%-100% of maximum. It is preferable that the value of the output power is reset to maximum each time the laser emission is turned. This allows the initial state of the laser to be assumed to be at maximum power. Operating the laser at maximum power at the start ensures the melt pool is formed quickly. The deposition process is then monitored by the sensor that receives light that has been filtered for a predetermined wavelength range and converts the photon emissions to some voltage level. A laser power correction is computed by multiplying the measured voltage by the proportionality constant. The laser power correction is then applied to the energy source. The method continues to monitor the deposition process. The laser source is preferably controlled by a personal computer through a control loop. The foregoing process continues as long as the laser is active, preferably at a high rate. In experiments, a rate of at least 100 Hz has proven to be desirable.

The sensor measures the magnitude of a small wavelength band that is specific to the metal being processed. That magnitude is used as an estimator of how much area is visible to the sensor and is above a threshold temperature. The area estimate is assumed to be proportional to some volume around the melt pool. The volume around the melt pool in a specific temperature range is an estimator of the spatial thermal gradient. Because the laser itself is moving relative to the substrate, the spatial thermal gradient and the cooling rate (i.e. temporal thermal gradient) are also related. Cooling rates are well known to be important drivers for certain properties in metals processing, and these cooling rates serve as desirable process targets. The inventive sensor method and system correlates cooling rate back to a simple measurement and yields a technique for driving the process to some sort of steady cooling rate, which implies consistent physical properties of the product.

As noted, a key distinction between the inventive system and method described herein and the prior at lies in the fact that the invention does not focus on the temperature or area of the melt pool (and in fact, excludes certain directly observable characteristics of the melt pool), but on the quantity of hot zone material around the melt pool. That quantity of hot zone material correlates to intensity of radiation. Specifically, the intensity of radiation within a certain range indicates the quantity of heat in the hot zone, which in turn can be used a predictor of melt pool integrity. Hence, it is important that a measurable radiation wavelength range associated with a desirable state of the hot zone be chosen for measurement. This choice is system and material specific.

The sensor and the processor analyzing the signal output by the sensor essentially operates as an electronic blacksmith's eye and measures emission within a certain range and uses that measurement to control beam power based upon control logic. The logic is based upon a prediction using Planck's equation as to the magnitude of photons within a certain range that should incandesce from the workpiece environment during the process. The frequency range is associated with optimum hot zone emission and hence size of the hot zone. The optics for a system are system specific and designed to acquire data from a region of interest as defined by the size of the region for which thermal control is desired. In the case of the exemplary laser deposition process the region of interest is the hot zone, which has a breadth in the range of 20 times the radius of the energy input spot around the energy point source.

The input energy from the laser is controlled depending on the detected surface temperature of the material at the spot of the hot zone. Such feedback control keeps the build-substrate region at a certain temperature. Measuring the surface temperature of the hot zone is thus used as a proxy for judging the quality of the build. For example, the power of the laser beam is controlled as a function of the laser energy absorbed—as revealed by the condition of the hot zone. By modulating laser beam power (or other process parameter) in this fashion, the temperature of the work environment is controlled.

Figure 6:
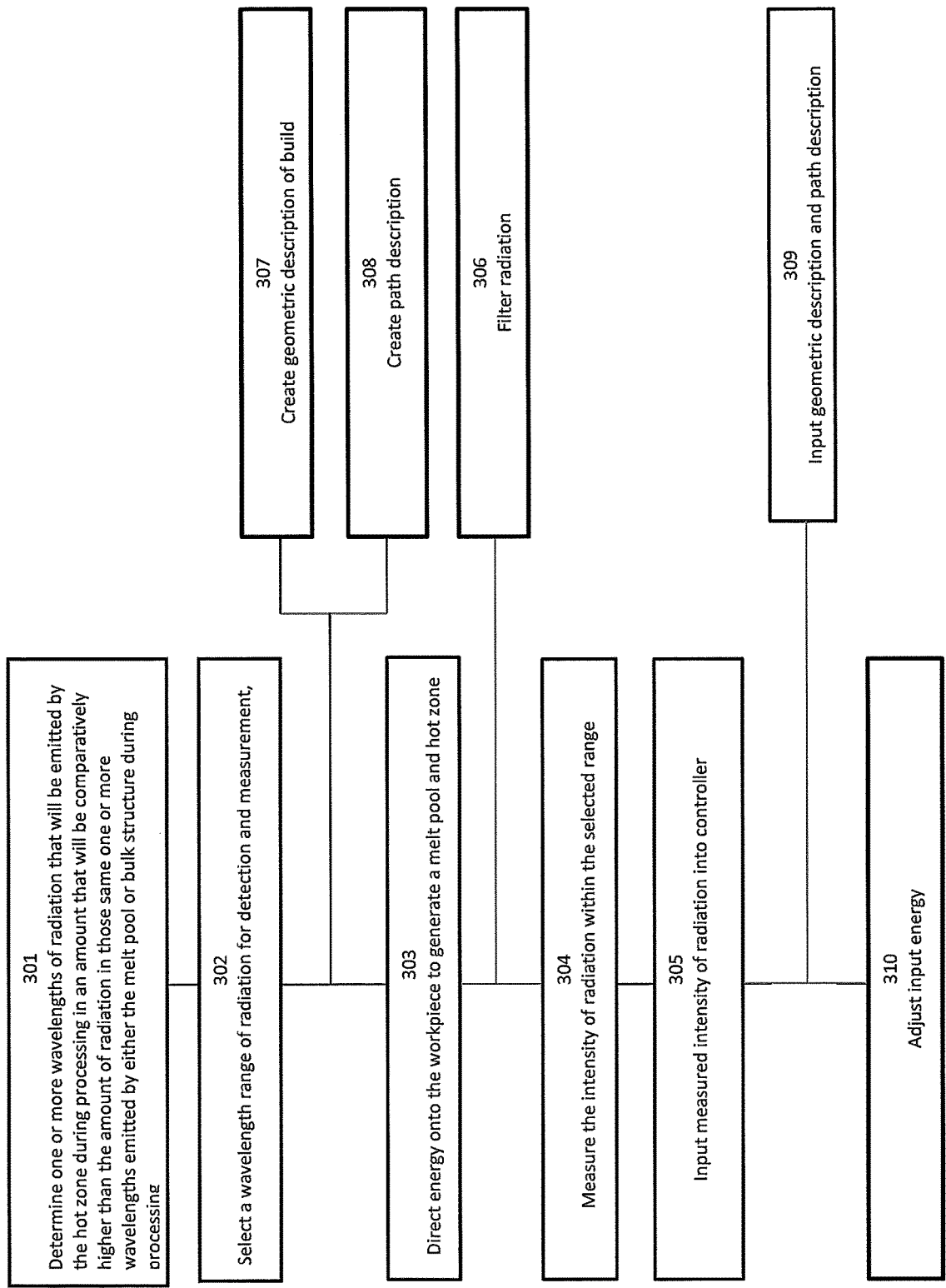
FIG. 6 is a flow chart of an embodiment of the method for controlling input energy from an energy point source according to the present invention sensor technique.

Thus, in a first preferred embodiment depicted in FIG. 6, the invention is directed to a method for controlling, during metal processing, the input energy from an energy point source that directs focused emitted energy on to a metal workpiece. The method comprises determining one or more wavelengths of radiation that will be emitted by the hot zone during processing in an amount that will be comparatively higher than the amount of radiation in those same one or more wavelengths emitted by either the melt pool or bulk structure during processing (step 301). The method further includes selecting a wavelength range of radiation for detection and measurement, the selected wavelength range including the one or more wavelengths of radiation determined to be emitted by the hot zone during processing in an amount comparatively higher than that emitted by the melt pool or bulk structure (step 302). Focused emitted energy is directed from the energy point source onto the workpiece to generate a melt pool and hot zone on the workpiece (step 303). The intensity of radiation within the selected range of radiation is measured (step 304) and the measured intensity of the radiation is input into the controller (step 305) and the input energy from the energy point source is adjusted based upon that measured intensity (step 310).

In a second embodiment, the invention is directed to a method for controlling, during metal processing, the input energy from an energy point source that directs focused emitted energy on to a metal workpiece. The method comprises using focused emitted energy to generate a melt pool and hot zone on the workpiece. The intensity of radiation emitted by the hot zone within a determined wavelength range is measured. The determined wavelength range is within a spectral range of radiation emitted by the hot zone during processing that is comparatively high in amount in relation to the amount of radiation emitted by the melt pool in that same spectral range during processing. Then, the input energy from the energy point source is adjusted based upon the measured intensity of radiation within the determined wavelength range.

In another embodiment the invention is directed to a method for controlling, during metal processing, the input energy from an energy point source that directs focused emitted energy on to a metal workpiece, wherein the directed focused emitted energy creates a melt pool and hot zone on the workpiece, the melt pool and hot zone each emitting radiation during the process. This embodiment method comprises determining a wavelength range correlating to a spectral range of radiation emitted by the hot zone during processing that is comparatively high in relation to the radiation emitted by the melt pool in that spectral range during processing. Then a beam is directed onto the workpiece to generate a melt pool and hot zone on the structure. The intensity of radiation within the determined wavelength range is measured. The input energy from the energy point source is adjusted based upon the measured intensity of radiation within the determined wavelength range.

The invention is also directed to an embodiment method for forming a build having a geometry on a substrate by an additive layering process, the additive layering process involves introducing a stock material into a beam produced by an energy point source. The particular embodiment method comprises using the beam to generate a melt pool and hot zone on the structure. Next the stock material is fed into the melt pool. The intensity of radiation emitted by the workpiece within a predetermined wavelength range is measured. The determined wavelength range is within a spectral range of radiation emitted by the hot zone during processing that is comparatively high in amount in relation to the amount of radiation emitted by the melt pool in that spectral range during processing. The input energy from the energy point source is then adjusted based upon the measured intensity of radiation emitted by the hot zone within the specific wavelength range.

In any of the foregoing methods, prior to measuring the radiation, the radiation from the workpiece can be filtered to block radiation outside the determined wavelength range from being measured (step 306). Similarly, each of the methods can be enhanced to include prior to generating the melt pool: creating a geometric description representing the geometry of the build during the additive layering (step 307); and creating a path description that represents the path of the energy point source through space during the additive layering (step 308). The geometric description and path description are used as inputs in conjunction with the measured intensity of the radiation to modulate input energy from the beam (step 309).

In another embodiment, the invention is directed to a system for processing metal using an energy point source. The embodiment system comprises an energy point source configured to direct focused emitted energy upon the workpiece, the focused emitted energy when applied to the workpiece creates a melt pool and hot zone on the workpiece. A sensor is adapted to receive and measure intensity of radiation within a specific wavelength range that corresponds to a spectral range of radiation emitted by the hot zone during processing that is comparatively high in amount in relation to the amount of radiation emitted by the melt pool in that spectral range during processing. Further, the sensor is configured to output an electric signal based upon the intensity of that radiation. The system also includes a controller configured to receive the electric signal output by the sensor and adjust input energy from the energy point source based upon the electric signal received from the sensor.

Another embodiment is directed to a system for forming a build on a substrate by additive layering and comprises an energy point source configured to direct a beam upon the substrate. The beam when applied to the substrate creates a melt pool and hot zone on the substrate. The energy point source is configured to heat a stock material fed into the melt pool such that the stock material is deposited upon the substrate and forms the build. A sensor is adapted to receive and measure intensity of radiation within a specific wavelength range. The determined wavelength range is within a spectral range of radiation emitted by the hot zone during processing that is comparatively high in amount in relation to the amount of radiation emitted by the melt pool in that spectral range during processing. The sensor outputs an electric signal based upon the intensity of that radiation to a controller. The controller is configured to receive the electric signal output by the sensor and adjust input energy from the energy point source based upon the electric signal received from the sensor. The system can include one or more lenses to focus the radiation onto the sensor and one or more filters to filter radiation outside the specific wavelength range and prevent it from being received by the sensor.

The embodiment systems described above can include a support to hold the substrate and move the substrate relative to the energy point source. Preferably, the one or more filters and the one or more lenses are unitarily housed within a sensor-optics unit with the sensor. The lenses are configured to focus the received radiation from the hot zone onto the sensor.

The processes and systems described herein can also be used in connection with other traditional welding techniques, such as TIG welding, GMA welding, PTA welding and EB welding. While the embodiments of the method and system of the present invention have been described herein, numerous modifications, alterations and changes to the described embodiments are possible without departing from the scope of the invention. The embodiments described herein are not intended to be limiting.

What is claimed is:

1. A method for controlling, during metal processing, an input energy from an energy point source that inputs focused emitted energy into a workpiece made from a type of metal and having a solidus temperature, the input energy forming a melt pool, a hot zone and a remaining bulk structure area on the workpiece and the melt pool, the hot zone and the remaining bulk structure area each emitting in determinable wavelength ranges an amount of radiation during the processing, the method comprising:

a) determining a wavelength range of radiation that the hot zone will emit during processing in an amount that is at least two times higher than the amount of radiation that either the melt pool or the remaining bulk structure area will emit in that wavelength range during processing, the determined wavelength range further corresponding to a temperature range below the solidus temperature for the workpiece;

b) inputting focused emitted energy from the energy point source into the workpiece to generate the melt pool and hot zone on the workpiece and cause the workpiece to emit radiation that is within the determined wavelength range of radiation;

c) comparing a sensor output by a sensor to a predicted sensor output value, the sensor output being based upon the amount of radiation within the determined wavelength range of radiation sensed by the sensor from a portion of the workpiece during processing, the portion including the melt pool and hot zone;

d) the predicted sensor output value being based upon a predicted amount of radiation within the determined wavelength range of radiation sensed by the sensor from a portion of the workpiece during processing, the portion including the melt pool and hot zone, the type of metal, the solidus temperature and an amount of the workpiece visible to the sensor; and e) adjusting the input energy from the energy point source based upon the comparison of the sensor output to the predicted sensor output value.

2. The method of claim 1 further including prior to step "c" filtering the radiation from the workpiece to block radiation outside the determined wavelength range from being sensed.

3. A method for controlling, during metal processing, the input energy from an energy point source that inputs focused emitted energy into a workpiece made from a type of metal, the method comprising:

a) inputting focused emitted energy from the energy point source into the workpiece to generate a melt pool and hot zone on the workpiece, the melt pool and the hot zone each emitting in determinable wavelength ranges an amount of radiation;

b) comparing a sensor output by a sensor to a predicted sensor output value, the sensor output being based upon the amount of radiation within a determined wavelength range of radiation sensed by the sensor from a portion of the workpiece during processing, the portion including the melt pool and hot zone;

c) the determined wavelength range being within a wavelength range of radiation emitted by the hot zone during processing that is at least two times higher in amount than the amount of radiation emitted by the melt pool in that wavelength range during processing, the determined wavelength range further corresponding to a temperature range below the solidus temperature for the workpiece;

d) the predicted sensor output value being based upon a predicted amount of radiation within the determined wavelength range of radiation sensed by the sensor from a portion of the workpiece during processing, the portion including the melt pool and hot zone, the type of metal, the solidus temperature and an amount of the workpiece visible to the sensor; and e) adjusting the input energy from the energy point source based upon the comparison of the sensor output to the predicted sensor output value.

4. The method of claim 3 further including prior to step "b" filtering the radiation from the workpiece to block radiation outside the determined wavelength range from being sensed.

5. A method for controlling, during metal processing, an input energy from an energy point source that inputs focused emitted energy into a workpiece made from a type of metal and having a solidus temperature, wherein the input energy creates a melt pool and hot zone on the workpiece, the melt pool and hot zone each emitting an amount of radiation in determinable wavelength ranges during the process, the method comprising:

a) determining a wavelength range of radiation that the hot zone will emit during processing that is at least twice as high in amount as the radiation that the melt pool will emit in that wavelength range during processing, the determined wavelength range further corresponding to a temperature range below the solidus temperature for the workpiece;

b) inputting the focused emitted energy from the energy point source into the workpiece to generate a melt pool and hot zone on the workpiece;

c) comparing a sensor output by a sensor to a predicted sensor output value, the sensor output being based upon the amount of radiation within the determined wavelength range of radiation sensed by the sensor from a portion of the workpiece during processing, the portion including the melt pool and hot zone;

d) the predicted sensor output value being based upon a predicted amount of radiation within the determined wavelength range of radiation sensed by the sensor from a portion of the workpiece during processing, the portion including the melt pool and hot zone, the type of metal, the solidus temperature and an amount of the workpiece visible to the sensor; and e) adjusting the input energy from the energy point source based upon the comparison of the sensor output to the predicted sensor output value.

6. The method of claim 5 further including prior to step "c" filtering the radiation from the workpiece to block radiation outside the determined wavelength range from being sensed.

7. A system for processing a workpiece made from a type of metal and having a solidus temperature, the system comprising:

a) an energy point source inputting focused emitted energy into the workpiece, the focused emitted energy when applied to the workpiece creating a melt pool and hot zone on the workpiece, the melt pool and the hot zone each emitting in determinable wavelength ranges an amount of radiation during the processing;

b) a sensor outputting a signal based upon the amount of radiation within a specific wavelength range of radiation sensed by the sensor from a portion of the workpiece during processing, the portion including the melt pool and hot zone and the specific wavelength range being within a range of radiation emitted by the hot zone during processing that is at least twice as high in amount as the amount of radiation emitted by the melt pool in that range during processing, the specific wavelength range further corresponding to a temperature range below the solidus temperature for the workpiece; and c) a controller;

d) the controller comparing the signal output by the sensor to a predicted sensor output value, the predicted sensor output value being based upon a predicted amount of radiation within the determined wavelength range of radiation sensed by the sensor from a portion of the workpiece during processing, the portion including the melt pool and hot zone, the type of metal, the solidus temperature and an amount of the workpiece visible to the sensor; and e) the controller adjusting the input energy from the energy point source based upon the comparison of the sensor output to the predicted sensor output value.

8. The system of claim 7 further including:
one or more lenses to focus the radiation onto the sensor; and
one or more filters to filter out radiation outside the specific wavelength range and prevent it from being received by the sensor.

9. The system of claim 8 wherein the sensor, the one or more filters and the one or more lenses are unitarily housed within a sensor-optics unit.

10. The system of claim 8 further including a support to hold the workpiece and move the workpiece relative to the energy point source.

11. The method of claim 1 further including prior to step "c" filtering the radiation from the workpiece to block radiation in a wavelength range in which the amount of radiation emitted by the melt pool during processing is at least two times higher than the amount of radiation emitted by the hot zone in that wavelength range during processing.

12. The method of claim 3 further including prior to step "b" filtering the radiation from the workpiece to block radiation in a wavelength range in which the amount of radiation emitted by the melt pool during processing is at least two times higher than the amount of radiation emitted by the hot zone in that wavelength range during processing.

13. The method of claim 5 further including prior to step "c" filtering the radiation from the workpiece to block radiation in a wavelength range in which the amount of radiation emitted by the melt pool during processing is at least two times higher than the amount of radiation emitted by the hot zone in that wavelength range during processing.

14. The system of claim 7 further including:
one or more lenses to focus the radiation onto the sensor; and
one or more filters to filter out radiation in a wavelength range in which the amount of radiation emitted by the melt pool during processing is at least two times higher than the amount of radiation emitted by the hot zone in that wavelength range during processing.

* * * * *

UNITED STATES PATENT AND TRADEMARK OFFICE
CERTIFICATE OF CORRECTION

| | |
|---|---|
| PATENT NO. | : 10,632,566 B2 |
| APPLICATION NO. | : 14/558306 |
| DATED | : April 28, 2020 |
| INVENTOR(S) | : Todd Eugene Sparks |

It is certified that error appears in the above-identified patent and that said Letters Patent is hereby corrected as shown below:

In the Specification

In Column 6, in Line 5, "provide" is changed to --provided--.

In Column 10, in Line 15, "at" is changed to --art--.

Signed and Sealed this
Sixteenth Day of June, 2020

Andrei Iancu
*Director of the United States Patent and Trademark Office*